(12) United States Patent
Shaw

(10) Patent No.: US 7,131,581 B2
(45) Date of Patent: Nov. 7, 2006

(54) SYSTEM FOR AND METHOD OF AUTHENTICATING ITEMS

(75) Inventor: Grant Langley Hohepa Shaw, Perth (AU)

(73) Assignee: Shaw IP Pty., Ltd., West Perth (AU)

( * ) Notice: Subject to any disclaimer, the term of this patent is extended or adjusted under 35 U.S.C. 154(b) by 135 days.

(21) Appl. No.: 10/475,155

(22) PCT Filed: Apr. 9, 2003

(86) PCT No.: PCT/AU03/00419

§ 371 (c)(1),
(2), (4) Date: Oct. 15, 2003

(87) PCT Pub. No.: WO03/088155

PCT Pub. Date: Oct. 23, 2003

(65) Prior Publication Data

US 2004/0140349 A1    Jul. 22, 2004

(30) Foreign Application Priority Data

Apr. 10, 2002   (AU) ................................. PS1662

(51) Int. Cl.
*G06K 5/00*   (2006.01)
(52) U.S. Cl. ..................................... 235/380; 235/487
(58) Field of Classification Search ................ 235/380, 235/375, 385, 470, 485, 487; 705/1, 58, 705/67, 28; 713/176
See application file for complete search history.

(56) References Cited

U.S. PATENT DOCUMENTS

| 5,306,049 | A | 4/1994 | Schireck |
| 5,380,047 | A | 1/1995 | Molee et al. |
| 5,963,134 | A | 10/1999 | Bowers et al. |
| 6,250,549 | B1 | 6/2001 | DeFabio, Jr. |
| 6,475,634 | B1 * | 11/2002 | Lam ........................ 428/542.4 |
| 6,498,864 | B1 | 12/2002 | Roseman et al. |
| 6,591,252 | B1 * | 7/2003 | Young ......................... 705/67 |
| 6,612,494 | B1 * | 9/2003 | Outwater ............... 235/462.04 |
| 6,827,209 | B1 * | 12/2004 | Tank et al. ................. 206/232 |
| 6,839,453 | B1 * | 1/2005 | McWilliam et al. ........ 382/119 |
| 6,920,428 | B1 * | 7/2005 | Greene ........................ 705/16 |
| 7,017,808 | B1 * | 3/2006 | Holzer ....................... 235/385 |
| 2001/0033916 | A1 * | 10/2001 | McCormick et al. ....... 428/195 |
| 2002/0133703 | A1 * | 9/2002 | Morgan ...................... 713/170 |
| 2002/0178363 | A1 * | 11/2002 | Ambrogio et al. .......... 713/176 |

(Continued)

*Primary Examiner*—Thien M. Le
*Assistant Examiner*—Edwyn Labaze
(74) *Attorney, Agent, or Firm*—Clements Walker; Gregory N. Clements; Christopher L. Bernard

(57) ABSTRACT

A system (10) is disclosed for authenticating an item (12), the item (12) being associated with an event or associated with one or more participants (70) in the event. The system (10) comprises first identification means (14) incorporated into an item (12) prior to an event, the first identification means (14) having an associated unique identifier, a database (22) for storing an item record including information indicative of the unique identifier and information indicative of the item (12), and detecting means (20) for authenticating that the item (12) has been used at the event by detecting the first identification means (14) and recognising the unique identifier during the event whilst the item (12) is being used. The arrangement is such that the item record is updated so as to include information indicative of the event in which the item (12) has been used when the item (12) has been detected by the detecting means (20). A corresponding method is also disclosed.

67 Claims, 6 Drawing Sheets

U.S. PATENT DOCUMENTS

2003/0046543 A1* 3/2003 Houston et al. ............ 713/176
2003/0071733 A1* 4/2003 Hall et al. ............... 340/573.1
2003/0097307 A1* 5/2003 Greene ....................... 705/26
2003/0130912 A1* 7/2003 Davis et al. .................. 705/28
2004/0088231 A1* 5/2004 Davis, Jr. .................... 705/28

* cited by examiner

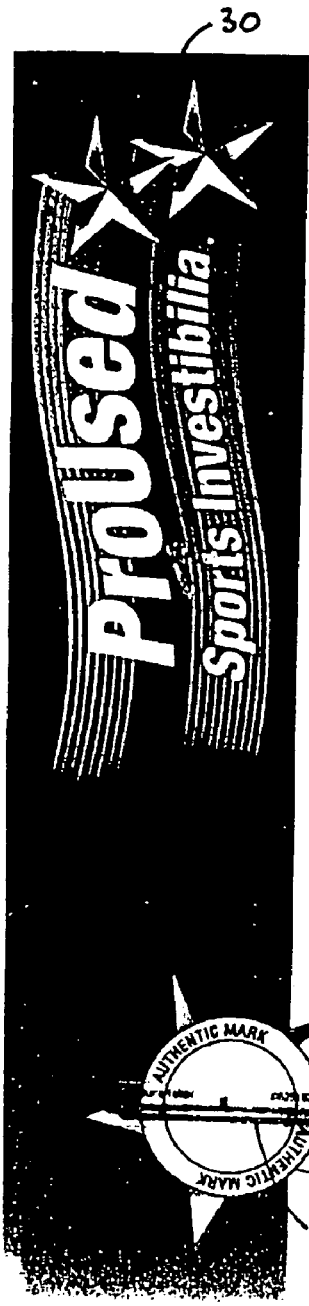

ProUsed Investibilia
Pre-authenticated Used Sports Memorabilia
for Collectors and Investors

Certificate of Authenticity
This certificate guarantees the authenticity of
the associated ProUsed Investibilia Item

REGISTRATION FOR TRANSFER OF OWNERSHIP

ProUsed Item Identification No.....................
Date of Purchase.....................

SELLER DETAILS
Seller's Name.....................
Address.....................
Date of Sale.....................
Amount of Sale (for evaluation purposes).....................

I,.....................understand selling this ProUsed
article as a true and original ProUsed piece. I declare that
the proof of Authentication has not been tampered with,
changed or duplicated in any way.

Signed..................... Date.....................

BUYER DETAILS
Buyer's Name.....................
Address.....................

I,.....................understand that upon buying a
ProUsed article that I am bound by the ProUsed conditions
and rules of registration of ownership, i.e. registration upon
purchase and non-tampering on authentication proof and
purchase.

Signed..................... Date.....................

Signed ProUsed Pty Ltd REP.....................

Registration of a ProUsed article on re-sale is required to retain the authentication and valuation provided by ProUsed to prevent sale of fraudulent items. Failure to register transfer of ownership document null and voids all authentication and registration protection provided by ProUsed Pty Ltd and all pertinent information will be removed from the database making the article no longer a ProUsed article. Loss of registration form needs to be reported to the company immediately.

FOR OFFICE USE ONLY
S.O.R.
New Form/Form No.
Date
Recorded by

Fig. 3

SYSTEM FOR AND METHOD OF AUTHENTICATING ITEMS

FIELD OF THE INVENTION

The present invention relates to an authentication system for authenticating items and to a method of authenticating such items.

The present invention has particular application in authenticating items of potential collectable and memorabilia value, such items including garments worn by participants in an event, items used by a participant in an event, and so on. However, it will be understood that the invention has broader application.

BACKGROUND OF THE INVENTION

There is a substantial market worldwide in memorabilia and collectable items. Of particular interest to collectors are items which have been used or worn by a participant in an event of significance. For example, items which have been used in a major sporting event, which have used or worn by a sports participant whilst achieving a significant sporting feat, or which are known to have been worn by significant theatrical celebrities are known to be highly desired by collectors of memorabilia.

However, due to the high desirability and the consequent high value of such memorabilia items, it is not uncommon for items to be offered for sale with a fraudulent claim that the items are associated with an event or event participant of significance. As a result, a degree of uncertainty exists for prospective purchasers of memorabilia items because no guarantee exists as to the authenticity of the item.

A further difficulty also arises with memorabilia items in that it is difficult to place a value on a pre-existing memorabilia item because relatively little information is available as to previous sales dates and sales amounts and uncertainty exists as to the genuineness of the item.

SUMMARY OF THE INVENTION

In accordance with a first aspect of the present invention, there is provided a system for authenticating an item, said item being associated with an event or associated with one or more participants in the event, said system comprising:

first identification means incorporated into an item prior to an event, said first identification means having an associated unique identifier;

a database for storing an item record including information indicative of the unique identifier and information indicative of the item; and detecting means for authenticating that the item has been used at the event by detecting the first identification means and recognising the unique identifier during the event whilst the item is being used;

the arrangement being such that the item record is updated so as to include information indicative of the event in which the item has been used when the item has been detected by the detecting means.

In this way, for items which have potential memorabilia value, a degree of certainty may be provided to a prospective purchaser of an item of memorabilia that the item is genuine and was used in a particular event.

The event may be a sporting event such as a basketball game or a cricket match. As an alternative, the event may be a musical or theatrical event, a motion picture, a horse racing event, a circus performance, or any other event wherein items used in the event are of potential memorabilia value.

In one arrangement, the item is a garment worn by a participant in the event. The garment may be an article of clothing, footwear or headgear, or a jewellery item.

In an alternative arrangement, the item is an article used by a participant in the event. The item may be an article of sporting equipment, a musical instrument, or a theatrical prop.

The item record may include information indicative of the type of item, the identity of the event participant using the item, the contribution to the event made by the participant associated with the item and/or, when the item has been sold, details of the sale amount for the item. The item record may optionally further include an image or video of the item.

Preferably, the first identification means is a radio frequency identification (RFID) tag capable of storing a unique identifier which is detectable from a remote location by the detecting means. The first RFID tag may be a passive-type RFID tag.

The unique identifier associated with the first identification means may be a unique code which may be in the form of an alpha numeric code.

The first identification means may include a tamper minimisation arrangement which may include a heat sealed patch disposed over the first identification means. Alternatively, the first identification means may be sealed within a label or tag stitched or otherwise affixed to the item so as to thereby conceal the identification means.

Preferably, the system further includes scanning means for scanning the first identification means so as to provide the first identification means with an associated unique identifier, and for verifying that the unique identifier provided to the first identification means is correct.

Preferably, the system is arranged so as to facilitate on-line access to the item record so that the item record may be viewed from a remote location. The system may further be arranged so as to facilitate on-line purchasing of an item associated with the item record by a remotely located purchaser. In one arrangement, the system is further arranged so as to facilitate on-line bidding for the item.

Instead of facilitating on-line access to the item record, the system may be arranged so as to facilitate on-line access to a predetermined portion of the item record.

In one arrangement, the system may be further arranged such that when an item is used at a subsequent event, the detecting means detects the first identification means associated with the item during the event whilst the item is being used, and updates the item record so as to include information indicative of the subsequent event in which the item has been used.

In this way, the present authentication system may be used to record the history of an item by repeatedly updating the relevant item record each time the item is used in an event.

In one arrangement, the system is further arranged so as to issue registration means, which may be in the form of a registration certificate, when an item is sold, the registration means including second identification means, details of the purchased item and details of the purchaser and thereby current owner of the item. For subsequent sales of the item, the system may be arranged to issue subsequent registration means including details of the purchased item and details of the new owner.

The second identification means may be a second RFID tag which may be a passive-type RFID tag.

The second RFID tag may be provided with a unique code which may be different to or the same as the unique code associated with the first RFID tag.

The second identification means may be provided with a tamper minimisation arrangement, which may include a heat sealed patch disposed over the second identification means.

In one arrangement, an image of the registration means is included in the item record, for example in the form of a JPEG file.

In one arrangement, the system is further arranged so as to issue certification means, preferably in the form of a certificate of authenticity.

The certification means may be provided with third identification means which may be a third RFID tag. The third RFID tag may be a passive-type RFID tag.

Preferably, the third identification means is provided with a unique code which may be different to or the same as the unique code associated with the first and second RFID tags.

Preferably, the third identification means is provided with a tamper minimisation arrangement, which may include a heat sealed patch disposed over the third identification means.

The certification means may include details of the item and details of each event in which the item was used.

In one arrangement, an image of the certification means is included in the item record, for example in the form of a JPEG file.

In accordance with a second aspect of the present invention, there is provided a method of authenticating an item, said item being associated with an event or associated with one or more participants in the event, said method comprising the steps of:
  incorporating first identification means into an item prior to an event, said first identification means having an associated unique identifier;
  creating an item record and storing the item record on a database, said item record including information indicative of the unique identifier and information indicative of the item;
  authenticating that the item has been used at the event by detecting the first identification means and recognising the unique identifier during the event whilst the item is being used; and
  updating the item record so as to include information indicative of the event in which the item has been used.

The event may be a sporting event such as a basketball game or a cricket match. As an alternative, the event may be a musical or theatrical event, a motion picture, a horse racing event, a circus performance, or any other event wherein items used in the event are of potential memorabilia value.

In one arrangement, the item is a garment worn by a participant in the event. The garment may be an article of clothing, footwear or headgear, or a jewellery item.

In an alternative arrangement, the item is an article used by a participant in the event. The item may be an item of sporting equipment, a musical instrument, or a theatrical prop.

The item record may include information indicative of the type of item, the identity of the event participant using the item, the contribution to the event made by the participant associated with the item and/or, when the item has been sold, details of the sale amount for the item. The item record may optionally further include an image or video of the item.

Preferably, the first identification means is a RFID tag capable of storing a unique identifier which is detectable from a remote location by the detecting means. The first RFID tag may be a passive-type RFID tag.

The unique identifier associated with the first identification means may be a unique code which may be in the form of an alpha numeric code.

In one arrangement, the method further includes the step of providing the first identification means with a tamper minimisation arrangement which may take the form of a heat sealed patch disposed over the first identification means.

Preferably, the step of incorporating first identification means into an item includes the steps of scanning the first identification means so as to provide the first identification means with an associated unique identifier and verifying that the unique identifier provided to the first identification means is correct.

Preferably, the method further includes the step of facilitating on-line access to the item record so that the item record may be viewed from a remote location and, preferably, the method further includes the step of facilitating on-line purchasing of an item associated with the item record by a remotely located purchaser. The step of facilitating on-line purchasing of an item may include the step of facilitating on-line bidding for the item.

The step of facilitating access to the item record such that the item record may be viewed on-line may include the step of facilitating access to a predetermined portion of the item record.

In one arrangement, the method further includes the steps of using the item at a subsequent event, authenticating that the item has been used at the subsequent event by detecting the first identification means and recognising the unique identifier during the event whilst the item is being used, and updating the item record so as to include information indicative of the subsequent event in which the item has been used.

The method may further include the step of issuing registration means, which may be in the form of a registration certificate, when an item is sold, the registration means including second identification means, details of the purchased item and details of the purchaser and thereby current owner of the item. For subsequent sales of the item, the method may be arranged to issue subsequent registration means including details of the purchased item and details of the new owner.

The second identification means may be a second RFID tag which may be a passive-type RFID tag.

The second RFID tag may be provided with a unique code which may be different to or the same as the unique code associated with the first RFID tag.

The method may further include the step of providing the second identification means with a tamper minimisation arrangement which may take the form of a heat sealed patch disposed over the second identification means.

In one arrangement, an image of the registration means is included in the item record, for example in the form of a JPEG file.

The method may further include the step of issuing certification means, preferably in the form of a certificate of authenticity.

The certification means may be provided with third identification means which may be a third RFID tag. The third RFID tag may be a passive-type RFID tag.

Preferably, the third identification means is provided with a unique code which may be different to or the same as the unique code associated with the first and second RFID tags.

Preferably, the method further includes the step of providing the third identification means with a tamper minimisation arrangement, which may include a heat sealed patch disposed over the third identification means.

The certification means may include details of the item and details of each event in which the item was used.

The method may further include the step of including an image of the certification means in the item record, for example in the form of a JPEG file.

In accordance with a third aspect of the present invention, there is provided a management system for managing authenticated items, said system comprising:
- a plurality of authentication systems in accordance with the first aspect of the present invention;
- a central control unit in networked communication with the plurality of authentication systems, each authentication system being arranged to forward item records to the central control unit;
- a central database in communication with the central control unit for storing the forwarded item records; and
- means for facilitating on-line access to the item records in the central database.

In one arrangement, the central control unit is arranged so as to facilitate on-line purchasing of an item associated with the item record by a remotely located purchaser.

The management system may be further arranged so as to facilitate on-line bidding for the item.

BRIEF DESCRIPTION OF THE DRAWINGS

The present invention will now be described, by way of example only, with reference to the accompanying drawings, in which:

FIG. 3 is a diagrammatic plan view of a registration certificate for use with the system shown in FIG. 1;

DESCRIPTION OF AN EMBODIMENT OF THE INVENTION

Figure 1:
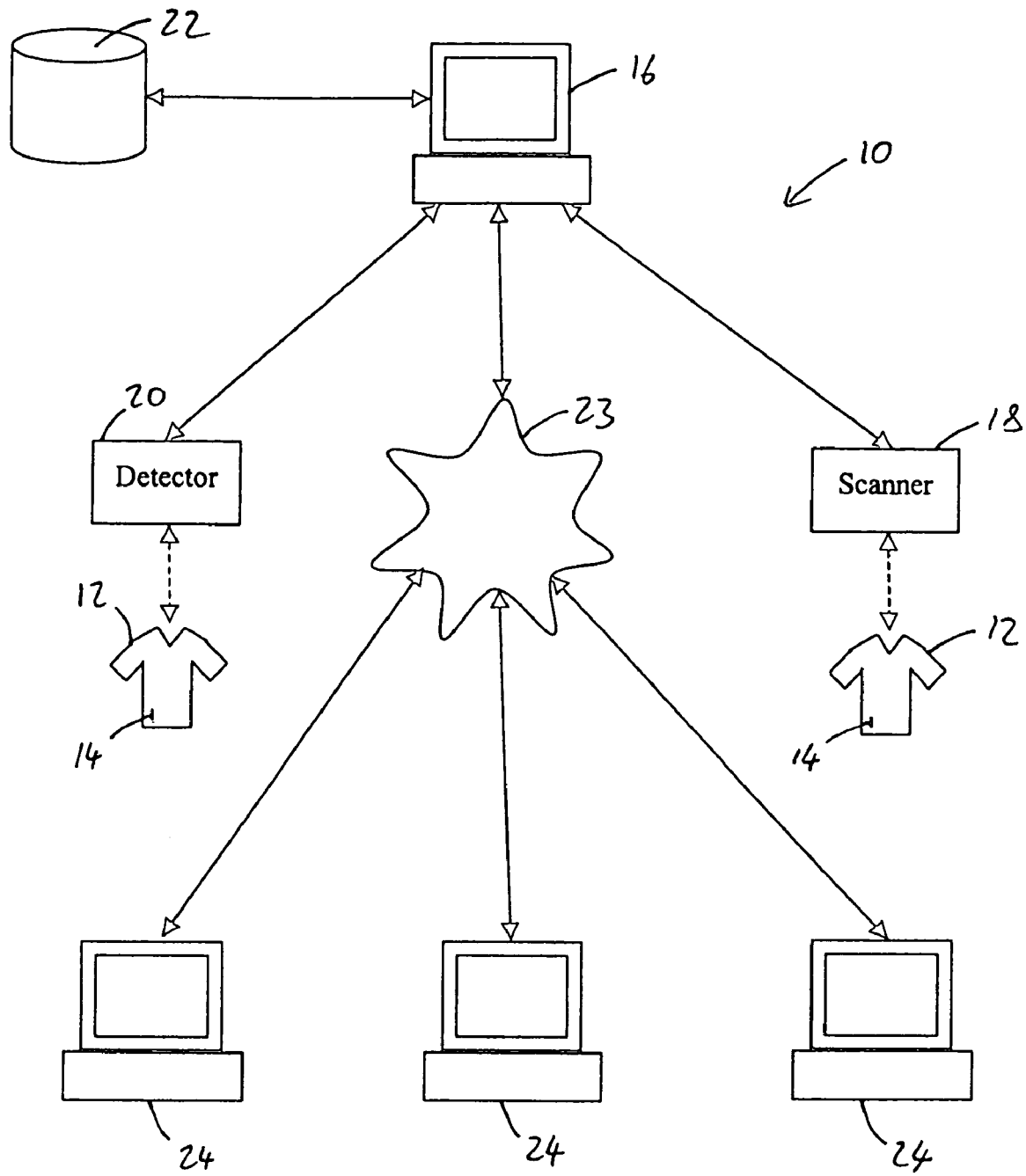
FIG. 1 is a diagrammatic block diagram of a system for authenticating an item in accordance with an embodiment of the present invention.

Referring to FIGS. 1 to 4 of the drawings, there is shown a system 10 for authenticating an item 12 whilst the item is being used at an event. In the embodiment shown in FIG. 1, the item 12 is a sports shirt, although it will be understood that a variety of items are envisaged, including sporting equipment, musical instruments, and so on, the important aspect being that the item is of a type which has potential memorabilia value by virtue of being used in an event, for example by a participant in the event.

Each item 12 to be authenticated is provided with first identification means 14 capable of storing a unique identifier. In this example, the first identification means is in the form of a first passive radio frequency identification (RFID) tag, although other arrangements are envisaged including active RFID tags, the important aspect being that the first identification means is capable of storing a unique identifier when scanned by an appropriate scanning device, and the unique identifier is capable of being detected and recognised from a remote location by a suitable detecting device.

The unique identifier may be in the form of a unique code, such as an alphanumeric code.

In order to reduce the likelihood of subsequent tampering with the first RFID tag 14, various tamper minimisation strategies may be employed. For example, a heat sealed patch may be fixed over the first RFID tag 14, the heat sealed patch being arranged to produce a visible indication when an attempt to tamper with the first RFID tag 16 has occurred.

The system 10 includes a control unit 16, in this example in the form of a computing device, for controlling and coordinating system operations and for interfacing with a system representative.

The system 10 also includes a scanning device 18 for remotely interacting with the first RFID tag 14 so as to provide the first RFID tag 14 with a first unique identifier, and for interacting with the first RFID tag 14 so as to verify that the first identifier provided to the first RFID tag 14 is correct.

The system 10 also includes a detecting device 20 which is located in use at an event, the detecting device 20 being disposed at a location such that a first RFID tag 14 present at the event is detectable by the detecting device 20 and the unique identifier associated with the first RFID tag 14 is retrievable by the detecting device 20. The detecting device 20 may be disposed at any suitable location for this purpose. For example, the detecting device 20 may be located in a passageway through which the participants travel in order to enter the playing area.

The system 10 further includes a database 22 for storing data. The data is stored in the database 22 in the form of a plurality of item records with each item record including item information, the relevant associated unique identifier and, when the item has been used at an event, information indicative of the relevant event in which the item has been used. The item information may include the type of item, the identity of the participant associated with the item, the contribution to the event made by the participant associated with the item, and so on. When the item 12 has been sold, the item record may include details of the sale amount.

In this example, the system 10 is also arranged such that the control unit 16 is accessible via any suitable network communications arrangement such as the Internet 23 from remote user terminals 24 so that operators of the user terminals 24 may view the item records stored in the database 22, for example with a view to purchasing an item referred to in the item records.

As shown in FIG. 3, the system 10 also includes a registration certificate 26 provided with second identification means 28, in this example in the form of a second passive RFID tag. The second RFID tag 28 is provided with a unique identifier which is the same as the unique identifier provided to the first RFID tag 14. In this way, the registration certificate 26 is linked to the item 12 associated with the first RFID tag 14 by the unique identifier. The registration certificate 26 serves to identify the current owner of an item 12. In this example, the registration certificate 26 includes indicia 30 identifying operators of the system 10, an item region 32 for identifying the item 12 and the date of purchase of the item 12, a seller region 34 for receiving details of a seller and details of the sale amount for the item, and a buyer region 36 for receiving details of a buyer.

Figure 4:
FIG. 4 is a diagrammatic plan view of a certificate of authenticity for use with the system shown in FIG. 1.

As shown in FIG. 4, the system 10 also includes a certificate of authenticity 38 provided with third identification means 40, in this example in the form of a passive RFID tag. The third RFID tag 40 is provided with a unique identifier which is the same as the unique identifier provided to the first and second RFID tags 14, 28. In this way, the certificate of authenticity is linked to the item 12 associated with the first RFID tag 14 and to the registration certificate 26 by the unique identifier. The certificate of authenticity 38 serves to provide a purchaser of an item with further verification that the purchased item is authentic.

In this example, the certificate of authenticity 38 includes an item details region 42 for receiving details of the relevant item 12 to be authenticated, and a participant region 44 for receiving a signature of the relevant participant, if any, associated with the item 12.

Operation of the system 10 will now be described with reference to FIGS. 1 to 5.

Figure 5:
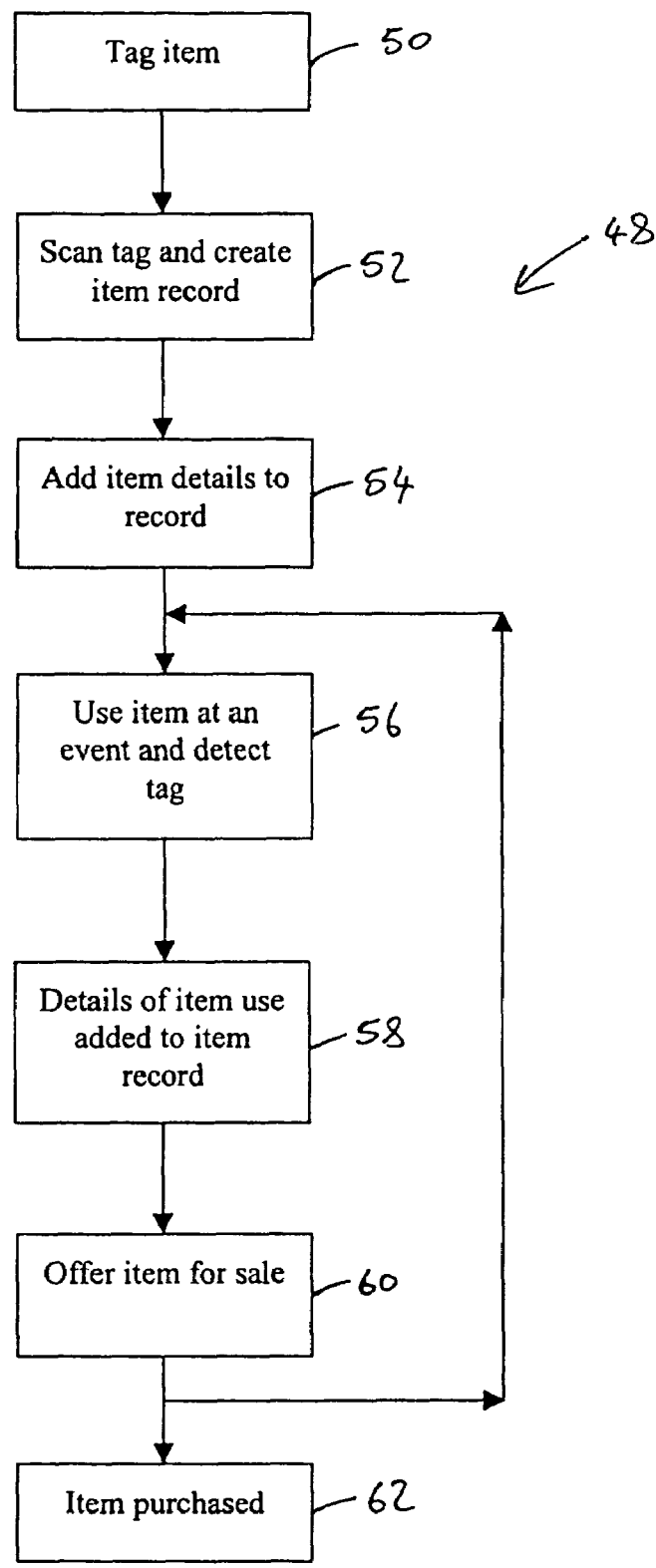
FIG. 5 is a flow diagram illustrating steps of a method of authenticating an item in accordance with an embodiment of the present invention.

In FIG. 5, there is shown a flow diagram 48 illustrating a method of authenticating an item in accordance with an embodiment of the present invention.

As indicated by method steps 50 to 62 of the flow diagram 48, an item 12 considered by operators of the system 10 to be of potential memorabilia value is tagged by applying a first identification tag 14 in the form of a first passive RFID tag to the item 12, optionally with any suitable tamper minimisation arrangement.

The first RFID tag 14 is then scanned using the scanning device 18 under control of the control unit 16 so as to provide the first RFID tag 14 with a unique identifier, in this example in the form of a unique code, and the unique identifier is verified by the scanning device 18 so as to ensure that the unique identifier associated with the first RFID tag 14 is correct. When the unique identifier has been verified, an item record is created by the control unit 16 and stored in the database 22, the tag record including information indicative of the unique identifier and details of the item 12 to which the first RFID tag 14 has been applied.

Figure 2:
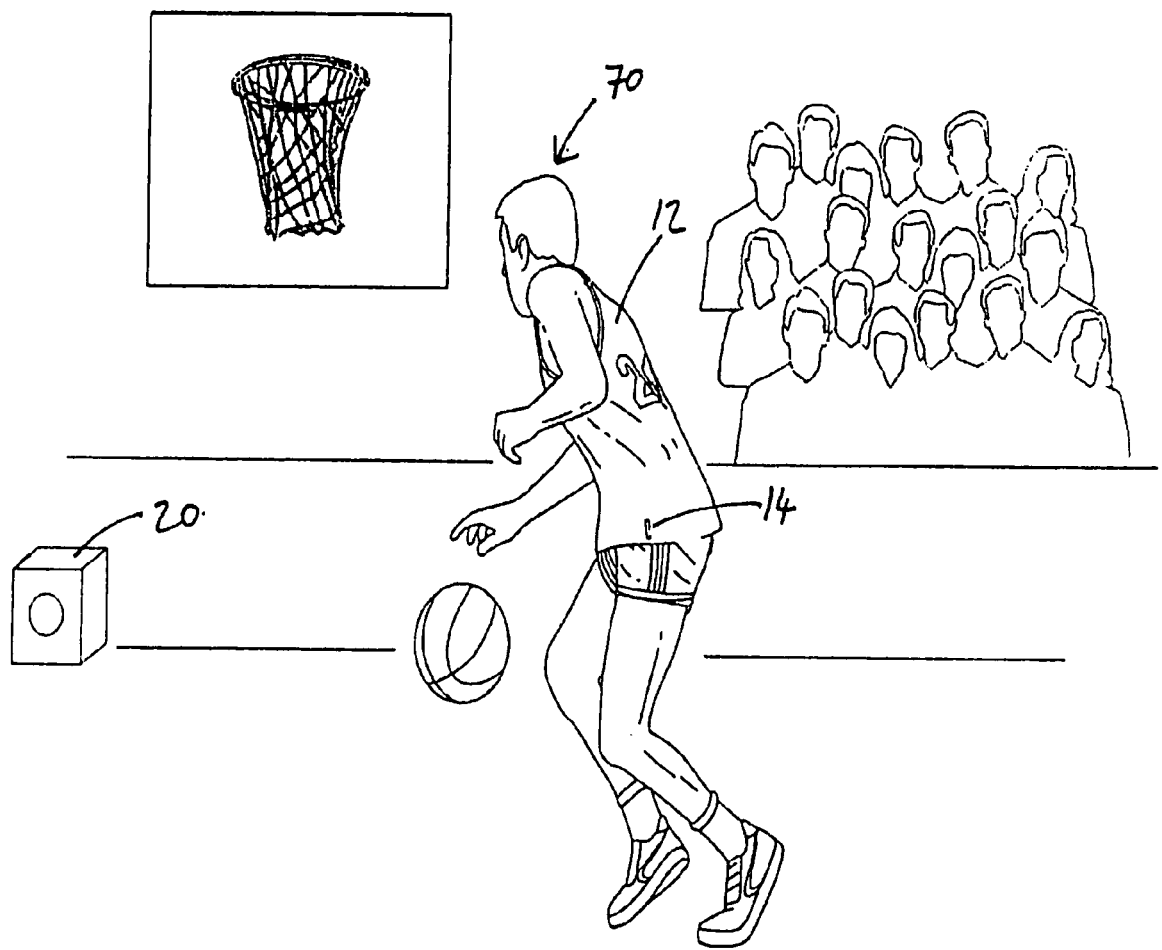
FIG. 2 is a diagrammatic representation of an event including first identification means and detecting means of the system shown in FIG. 1.

In a situation wherein the item is associated with a particular prospective participant in an event, the tagged item 12 is then returned to the participant 70, in this example a basketball player, as shown in FIG. 2, and the participant 70 uses the item 12 in the event. During the event, the detecting device 20 identifies the item 12 in use at the event by detecting the first RFID tag 14 and retrieves the unique identifier associated with the first RFID tag 14. Information indicative of the retrieved unique identifier is then passed from the detecting device 20 to the control unit 16 which uses the retrieved information to update the relevant item record in the database 22. In particular, the relevant item record is modified so as to indicate that the item has been used at an event and details of the event in which the item was used are added. Further information may also be added to the item record, such as information which describes the contribution made in the event by the relevant participant. For example, the further information may include details of the number of points scored by the participant, and so on.

When an item 12 has been used at an event and an item record updated so as to include details of the event in which the item 12 was used, the item 12 may be made available for sale on-line by facilitating access to the control unit 16 through the Internet 23. For example, the system 10 may be arranged so as to facilitate access to the item records by an operator of a remote terminal 24, and so as to facilitate on-line purchase of an item by selecting the appropriate item record. It will be understood that such an arrangement may be implemented in any suitable way. For example, the control unit 16 may include a web server arranged to serve details of the item records to a web page for access by a plurality of prospective purchasers, and appropriate software for securely accepting on-line payments. The control unit 16 may also be arranged to facilitate purchase and/or bidding for an item in real-time, that is, during the event by facilitating wireless communications between the control unit 16 and a mobile communications device, such as a mobile telephone, carried by a prospective purchaser. The prospective purchaser may be an event attendee, a TV viewer, and so on. The wireless communications may be in SMS format or any in other suitable communications format When an item 12 is sold by operators of the system 10, the relevant item record may be modified so as to include details of the purchaser and therefore the current owner of the item 12.

As indicated in the flow diagram 48 shown in FIG. 5, instead of or in addition to using the item 12 in one event and subsequently offering the item 12 for sale, the item 12 may be used in several events with the first RFID tag 14 being detected at each event and details of each event being added to the relevant item record.

Optionally, when an item 12 is sold by operators of the system 10, a registration certificate 26 which identifies the owner of the item 12 and which also includes a second identification means in the form of a second RFID tag 28 may be issued by the operators of the system 10. In this example, the second RFID tag 28 is provided with the same unique identifier as is provided to the first RFID tag 14 so that the registration certificate 26 and thereby the owner of the item 12 can be linked to the relevant item and item record by the unique identifier. It is envisaged that by only allowing users in possession of a valid registration certificate 26 to sell an item 12, a degree of protection that the seller is entitled to sell may be provided to a prospective purchaser.

For subsequent sales of the item 12, fresh registration certificates 26 may be produced, each registration certificate 26 including a first RFID tag 14 provided with the unique identifier associated with the item and details of the new owner.

Optionally, a certificate of authenticity 38 as shown in FIG. 4 may be issued by operators of the system 10. The certificate of authenticity serves to provide further authentication that the item 12 is genuine. The certificate of authenticity 38 is provided with a third identification means, in this example in the form of a third RFID tag 40. In this example, the third RFID tag 40 is provided with the same unique identifier as is provided to the first and second RFID tags 14, 28.

It will be understood that, in this way, the certificate of authenticity 38 is linked to the relevant item 12, item record and registration certificate 26 by virtue of the unique identifier.

Figure 6:
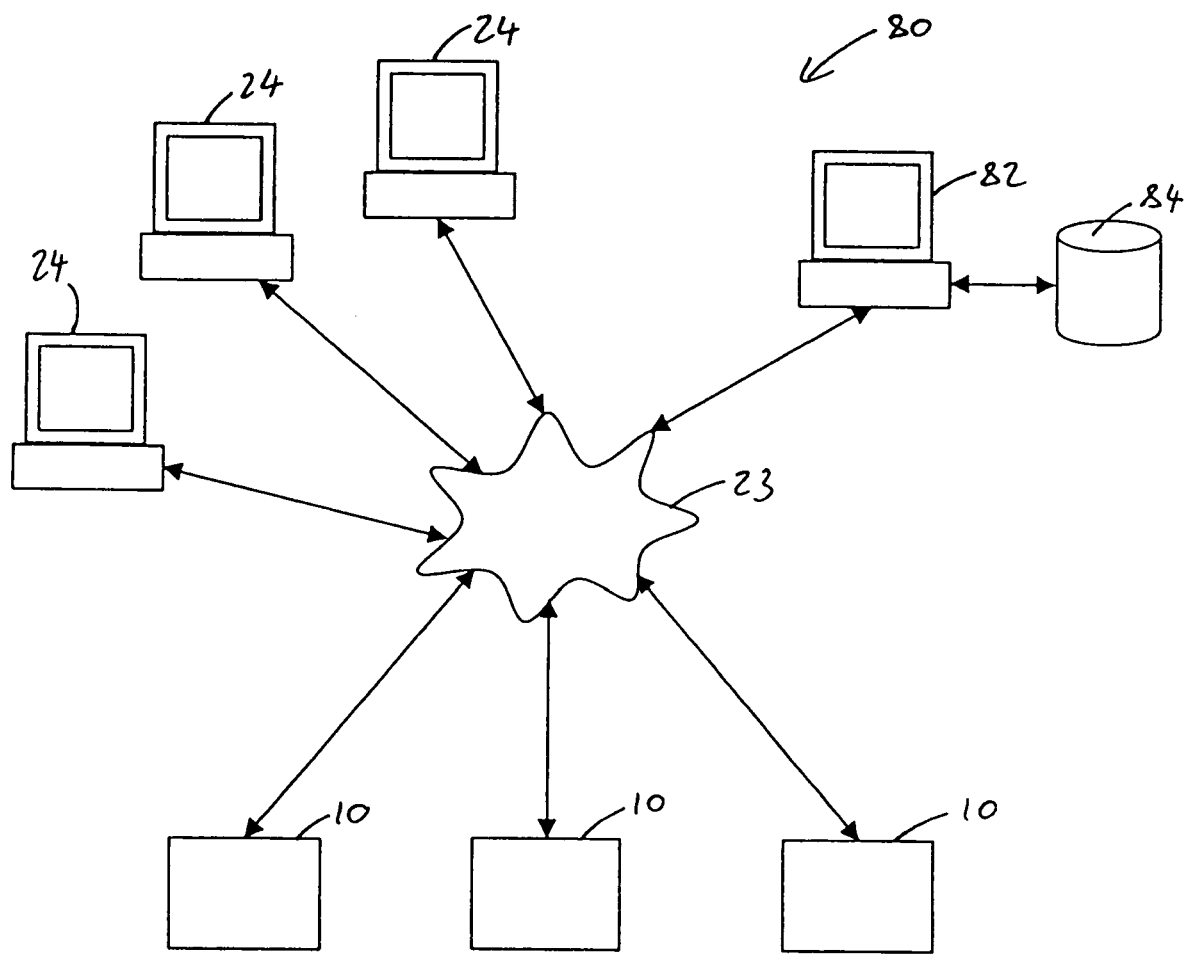
FIG. 6 is a diagrammatic block diagram of an item management system for use with the system shown in FIG. 1.

Referring to FIG. 6, there is shown an item management system 80 for use in managing items authenticated using an authentication system 10 of the type described above in relation to FIGS. 1 to 5. Like features are indicated with like reference numerals.

The item management system 80 includes a central control unit 82, in this example in the form of a computing device, and a central database 84 for storing item records created by a plurality of authentication systems 10.

The central control unit 82 is accessible via any suitable network communications arrangement such as the Internet 23 from remote user terminals 24 so that operators of the user terminals 24 may view the item records stored in the central database 84. The central control unit 82 is also in networked communication, in this example via the Internet 23, with a plurality of authentication systems 10, each authentication system being arranged to forward item records to the central control unit 82 for storage in the central database 84. The relevant item records may be forwarded from the authentication systems 10 to the central control unit 82 in any suitable format, for example in the form of an XML document.

The management system 80 is arranged such that item records created by all authentication systems 10 are available for viewing on-line by accessing the management system 80 and items associated with the item records are available for purchase on-line. It will be understood that such an arrangement may be implemented in any suitable way. For example, the central control unit 82 may include a web server arranged to serve item records to a web page for access by a plurality of user terminals 24, and may include appropriate software for securely accepting on-line payments. Alternatively, when a prospective purchaser has identified an item record associated with a desired item, the central control unit 82 may be arranged to direct the prospective purchaser to the authentication system 10 originally associated with the item.

As with the authentication system 10, the central control unit 82 may also be arranged so as to facilitate purchase and/or bidding for an item in real-time, that is, during the event by facilitating wireless communications between the central control unit 82 and a mobile communications device, such as a mobile telephone, carried by a prospective purchaser. The prospective purchaser may be an event attendee, a TV viewer, and so on. The wireless communications may be in SMS format or any in other suitable communications format In the present example, when an item record has been sold by operators of an authentication system 10 or by operators of the management system 80, the relevant item record is flagged with an appropriate identifier to indicate that the item associated with the item record has been sold. When this occurs, the item record is no longer available for viewing on the management system website or the authentication system website.

It will be understood that by providing such a management system 80, it is possible for a prospective purchaser to purchase items relating to a wide variety of events by accessing one website.

It will also be understood that although the above embodiments have been described in relation to first, second and third RFID tags which have the same unique code, other arrangements are possible. For example, the codes associated with the first, second and third RFID tags may be different.

Throughout the specification, unless the context requires otherwise, the word "comprise" or variations such as "comprises" or "comprising", will be understood to imply the inclusion of a stated integer or group of integers but not the exclusion of any other integer or group of integers.

Modifications and variations as would be apparent to a skilled addressee are deemed to be within the scope of the present invention.

The invention claimed is:

1. A system for authenticating an item, said item being associated with an event or associated with one or more participants in the event, said system comprising:

first identification means incorporated into an item prior to an event, said first identification means being a first RFID tag for storing an associated unique identifier which is detectable from a remote location;

a database for storing an item record including information indicative of the unique identifier and information indicative of the item;

detecting means for authenticating that the item has been used at the event by detecting the first identification means and recognizing the unique identifier during the event whilst the item is being used;

means for updating the item record to include information indicative of the event in which the item has been used when the item has been detected by the detecting means; and registration means that is issued with the item during the event, wherein the registration means comprises a second identification means which is a second RFID tag that stores a unique identifier that is linked to the unique identifier stored in the first RFID tag, details of the item and details of the event.

2. A system as claimed in claim 1, wherein the event is a sporting event.

3. A system as claimed in claim 1, wherein the event is a musical or theatrical event, a motion picture, a horse racing event or a circus performance.

4. A system as claimed in claim 1, wherein the item is a garment worn by a participant in the event.

5. A system as claimed in claim 4, wherein the garment is an article of clothing, footwear or headgear, or a jewelry item.

6. A system as claimed in claim 1, wherein the item is an article used by a participant in the event.

7. A system as claimed in claim 6, wherein the item is an article of sporting equipment, a musical instrument, or a theatrical prop.

8. A system as claimed in claim 1, wherein the item record includes information indicative of the type of item, the identity of the event participant using the item and/or the contribution to the event made by the participant associated with the item.

9. A system as claimed in claim 1, wherein, when the item has been sold, the item record includes details of a sale amount for the item.

10. A system as claimed in claim 1, wherein the item record includes an image or video of the item.

11. A system as claimed in claim 1, wherein the first RFID tag is a passive-type RFID tag.

12. A system as claimed in claim 1, wherein the unique identifier associated with the first identification means is in the form of an alpha numeric code.

13. A system as claimed in claim 1, wherein the first identification means includes a tamper minimisation arrangement.

14. A system as claimed in claim 13, wherein the tamper minimisation arrangement includes a heat sealed patch disposed over the first identification means.

15. A system as claimed in claim 1, further including scanning means for scanning the first identification means so as to provide the first identification means with an associated unique identifier and for verifying that the unique identifier provided to the first identification means is correct.

16. A system as claimed in claim 1, wherein the system is arranged so as to facilitate on-line access to the item record so that the item record may be viewed from a remote location.

17. A system as claimed in claim 1, wherein the system is arranged so as to facilitate on-line purchasing of an item associated with the item record by a remotely located purchaser.

18. A system as claimed in claim 17, wherein the system is further arranged so as to facilitate on-line bidding for the item.

19. A system as claimed in claim 1, wherein the system is further arranged such that when an item is used at a subsequent event, the detecting means detects the first identification means associated with the item during the event whilst the item is being used, and updates the item record so as to include information indicative of the subsequent event in which the item has been used.

20. A system as claimed claim 1, wherein for subsequent sales of the item, the system may be arranged to issue subsequent registration means including details of the purchased item and details of the new owner.

21. A system as claimed in claim 1, wherein the second RFID tag unique identifier is the same as the first RFID tag unique identifier.

22. A system as claimed in claim 1, wherein the second identification means is provided with a tamper minimisation arrangement.

23. A system as claimed in claim 22, wherein the tamper minimisation arrangement includes a heat sealed patch disposed over the second identification means.

24. A system as claimed claim 1, wherein an image of the registration means is included in the item record.

25. A system as claimed in claim 1, wherein the system is further arranged so as to issue certification means.

26. A system as claimed in claim 25, wherein the certification means is provided with third identification means.

27. A system as claimed in claim 26, wherein the third identification means is a third RFID tag.

28. A system as claimed in claim 26, wherein the third identification means is provided with a unique code which is the same as the unique code associated with the first and second RFID tags.

29. A system as claimed in claim 26, wherein the third identification means is provided with a tamper minimisation arrangement.

30. A system as claimed in claim 29, wherein the tamper minimisation arrangement includes a heat sealed patch disposed over the third identification means.

31. A system as claimed in claims 26, wherein the certification means includes details of the item and details of each event in which the item has been used.

32. A system as claimed in claim 26, wherein the item record includes an image of the certification means.

33. A method of authenticating an item, said item being associated with an event or associated with one or more participants in the event, said method comprising the steps of:
  incorporating first identification means into an item prior to an event, said first identification means being a first RFID tag for storing an associated unique identifier which is detectable from a remote location;
  creating an item record and storing the item record on a database, said item record including information indicative of the unique identifier and information indicative of the item;
  authenticating that the item has been used at the event by detecting the first identification means and recognizing the unique identifier during the event whilst the item is being used;
  updating the item record so as to include information indicative of the event in which the item has been used; and
  issuing a registration means with the item during the event to identify the item, the registration means including a second RFID tag that stores a unique identifier that is linked to the unique identifier stored in the first RFID tag.

34. A method as claimed in claim 33, wherein the event is a sporting event such as a basketball game or a cricket match.

35. A method as claimed in claim 33, wherein the event is a musical or theatrical event, a motion picture, a horse racing event, a circus performance.

36. A method as claimed in claim 33, wherein the item is a garment worn by a participant in the event.

37. A method as claimed in claim 36, wherein the garment is an article of clothing, footwear or headgear, or a jewellery item.

38. A method as claimed in claim 33, wherein the item is an article used by a participant in the event.

39. A method as claimed in claim 38, wherein the item is an article of sporting equipment, a musical instrument, or a theatrical prop.

40. A method as claimed in claim 33, wherein the item record includes information indicative of the type of item, the identity of the event participant using the item and/or the contribution to the event made by the participant associated with the item.

41. A method as claimed in claim 33, wherein, when the item has been sold, the item record includes details of a sale amount for the item.

42. A method as claimed in claim 33, wherein the item record includes an image or video of the item.

43. A method as claimed in claim 33, wherein the first RFID tag is a passive-type RFID tag.

44. A method as claimed in claim 33, wherein the unique identifier associated with the first identification means is in the form of an alpha numeric code.

45. A method as claimed in claim 33, further including the step of providing the first identification means with a tamper minimisation arrangement.

46. A method as claimed in claim 45, wherein the tamper minimisation arrangement includes a heat sealed patch disposed over the first identification means.

47. A method as claimed in claim 33, wherein the step of incorporating first identification means into an item includes the steps of scanning the first identification means so as to provide the first identification means with an associated unique identifier and verifying that the unique identifier provided to the first identification means is correct.

48. A method as claimed in 33, further including the step of facilitating on-line access to the item record so that the item record may be viewed from a remote location.

49. A method as claimed in claim 33, further including the step of facilitating on-line purchasing of an item associated with the item record by a remotely located purchaser.

50. A method as claimed in claim 49, wherein the step of facilitating on-line purchasing of an item includes the step of facilitating on-line bidding for the item.

51. A method as claimed in claims 33, further including the steps of using the item at a subsequent event, authenticating that the item has been used at the subsequent event by detecting the first identification means and recognizing the unique identifier during the event whilst the item is being used, and updating the item record so as to include information indicative of the subsequent event in which the item has been used.

52. A method as claimed in claim 33, wherein, for subsequent sales of the item, the method is arranged to issue subsequent registration means including details of the purchased item and details of the new owner.

53. A method as claimed in claim 33, wherein the second RFID tag is provided with a unique code which is the same as the unique code associated with the first RFID tag.

54. A method as claimed in claim 33, further including the step of providing the second identification means with a tamper minimisation arrangement.

55. A method as claimed in claim 54, wherein the tamper minimisation arrangement includes a heat sealed patch disposed over the second identification means.

56. A method as claimed in claim 33, wherein the item record includes an image of the registration means.

57. A method as claimed in claim 33, further including the step of issuing certification means.

58. A method as claimed claim 57, wherein the certification means is provided with third identification means.

59. A method as claimed in claim 58, wherein the third identification means is a third RFID tag.

60. A method as claimed in claim 58, wherein the third identification means is provided with a unique code which is the same as the unique code associated with the first and second RFID tags.

61. A method as claimed in claim 60, further including the step of providing the third identification means with a tamper minimisation arrangement.

62. A method as claimed in claim 61, wherein the tamper minimisation arrangement includes a heat sealed patch disposed over the third identification means.

63. A method as claimed in claim 57, wherein the certification means includes details of the item and details of each event in which the item was used.

64. A method as claimed in claim 57, further including the step of including an image of the certification means in the item record.

65. A management system for managing authenticated items, said system comprising:
   a) a plurality of authentication systems, each such system comprising:
      first identification means incorporated into an item prior to an event, said first identification means being a first RFID tag for storing an associated unique identifier which is detectable from a remote location;
      a database for storing an item record including information indicative of the unique identifier and information indicative of the item;
      detecting means for authenticating that the item has been used at the event by detecting the first identification means and recognizing the unique identifier during the event whilst the item is being used;
      means for updating the item record to include information indicative of the event in which the item has been used when the item has been detected by the detecting means; and
      registration means that is issued with the item during the event, wherein registration means comprises a second identification means which is a second RFID tag that stores a unique identifier that is linked to the unique identifier stored in the first RFID tag, details of the item and details of the event;
   b) a central control unit in networked communication with the plurality of authentication systems, each authentication system being arranged to forward item records to the central control unit;
   c) a central database in communication with the central control unit for storing the forwarded item records; and
   d) means for facilitating on-line access to the item records in the central database.

66. A management system as claimed in claim 65, wherein the central control unit is arranged so as to facilitate on-line purchasing of an item associated with the item record by a remotely located purchaser.

67. A management system as claim 65, wherein the central control unit is further arranged so as to facilitate on-line bidding for the item.

* * * * *